United States Patent [19]

Yamamoto et al.

[11] Patent Number: 5,656,696
[45] Date of Patent: Aug. 12, 1997

[54] RESIN COMPOSITION FOR INJECTION MOLDING

[75] Inventors: Koji Yamamoto; Keiko Shichijo; Norikazu Komiya, all of Yokkaichi, Japan

[73] Assignee: Mitsubishi Chemical Corporation, Tokyo, Japan

[21] Appl. No.: 200,683

[22] Filed: Feb. 23, 1994

[30] Foreign Application Priority Data

Mar. 2, 1993 [JP] Japan ................. 5-041375

[51] Int. Cl.$^6$ .................................. C08L 23/08
[52] U.S. Cl. .................................. 525/240; 525/348
[58] Field of Search .................................. 525/240

[56] References Cited

U.S. PATENT DOCUMENTS

| | | | |
|---|---|---|---|
| 4,243,619 | 1/1981 | Fraser et al. | 526/128 |
| 4,587,303 | 5/1986 | Turtle | 525/240 |
| 5,055,438 | 10/1991 | Canich | 526/141 |
| 5,084,534 | 1/1992 | Welborn et al. | 526/160 |
| 5,112,696 | 5/1992 | Roberts | 525/240 |
| 5,206,075 | 4/1993 | Hodgson | 525/240 |
| 5,260,384 | 11/1993 | Morimoto et al. | 525/240 |
| 5,278,272 | 1/1994 | Lai et al. | 526/348.6 |
| 5,376,439 | 12/1994 | Hodgson et al. | 525/240 |

FOREIGN PATENT DOCUMENTS

| | | |
|---|---|---|
| 0 492 656 | 7/1992 | European Pat. Off. . |
| 60-13831 | 1/1985 | Japan . |
| 60-013831 | 1/1985 | Japan . |
| 62-64846 | 3/1987 | Japan . |
| 90/03414 | 4/1990 | WIPO . |

OTHER PUBLICATIONS

Cooke et al–Addition of Branched Molecules and High MW Molecules to Improve Optical Properties of LLDPE Film–22 Antec 89.

Speed et al–"Structure/Property Relationships in Exxpol™ Polymers" SPE–Conference–Feb. 1991.

*Primary Examiner*—D. R. Wilson
*Attorney, Agent, or Firm*—Oblon, Spivak, McClelland, Maier & Neustadt, P.C.

[57] ABSTRACT

A resin composition for injection molding that has excellent transparency, and also has excellent strength and sufficient flexibility. The composition contains 50 to 99% by weight of component A, which is a copolymer of ethylene and α-olefin having a carbon number of not less than 4, and 1 to 50% by weight of component B, which is an olefin-containing polymer. The component A has: (a) a melt flow rate (MFR) of 10 to 120 g/10 min.; (b) a density (D) of not more than 0.915 g/cm$^3$; and (c) at least one peak of elution volume indicated by an elution curve obtained by temperature rising elution fractionation (TREF), wherein the peak corresponds to a temperature of not more than 85° C., and the elution curve may also indicate substantial elution volume at temperatures other than the temperature to which the peak corresponds.

30 Claims, No Drawings

RESIN COMPOSITION FOR INJECTION MOLDING

BACKGROUND OF THE INVENTION

1. Field of the Invention

The present invention relates to a resin composition for injection molding that has good moldability, such as spiral flow, and also has excellent transparency, excellent impact strength and tensile strength at normal and low temperatures, and good heat resistance while possessing good balance between strength and rigidity, and that may be advantageously used to form injection-molded products.

2. Description of the Related Art

Materials which have been used to produce food containers of flexible resins, such as Tupperware (registered trademark), include high-density polyethylene, polypropylene, high-pressure low-density polyethylene, and linear low-density polyethylene.

High-density polyethylene is disadvantageous in that it has poor flexibility and poor transparency. As a result of the poor transparency of high-density polyethylene, when a container made of this material contains objects therein, the contents cannot be seen or cannot be readily seen through the container. Thus, the practical value of such containers is reduced, and the range of use to which the containers can be applied is limited.

Polypropylene has relatively good transparency, and has good dynamic properties at normal temperature. However, polypropylene has insufficient strength at low temperatures. As a result, when polypropylene is used in freeze-preservation, cracking or whitening tends to be caused by the application of local stress. In addition, polypropylene has poor flexibility, with the result that, when a container made of polypropylene is bent to a relatively great extent, an irreversible whitening line may be formed, or the original shape cannot be readily recovered.

High-pressure low-density polyethylene is another material that has relatively good transparency. However, this material does not have sufficient heat resistance to be applicable in such uses as microwave ovens. In addition, high-pressure low-density polyethylene does not have enough resistance to environmental (stress) cracking (referred to as "ESCR") to be applicable in fields where resistance to acids and bases, resistance to oils, and/or resistance to chemicals are required. Thus, high-pressure low-density polyethylene only has limited range of application.

Linear low-density polyethylene has been introduced as a resin capable of overcoming the problems of the above resins. However, linear low-density polyethylene has not yet acquired the level of transparency required by the market, nor does it have sufficient flexibility.

SUMMARY OF THE INVENTION

An object of the present invention is to provide a resin composition suitable for the formation of injection-molded products, the resin composition having good moldability, such as spiral flow, and also having excellent transparency, excellent impact strength and tensile strength at normal and low temperatures, and good heat resistance while possessing a good balance between strength and rigidity thereof.

The present inventors have made various studies to overcome the above-described problems, and have found that the object of the present invention can be achieved by using a copolymer of ethylene and α-olefin that has specific properties. The present invention has been formulated on the basis of the above knowledge.

A resin composition for injection molding according to the present invention is characterized in that the resin composition contains component A and component B specified as follows:

Component A:

Component A is a copolymer of ethylene and α-olefin having a carbon number of not less than 4, the component A being contained in the resin composition in an amount of 50 to 99% by weight, and having the following properties (a) to (c):

(a) a melt flow rate (MFR) of 5 to 150 g/10 min.;

(b) a density (D) of not more than 0.915 g/cm$^3$; and (c) at least one peak of elution volume indicated by an elution curve obtained by temperature rising elution fractionation (TREF), wherein the peak corresponds to a temperature of not more than 100° C., and the elution curve may also indicate substantial elution volume at temperatures other than the temperature to which the peak corresponds.

Component B:

Component B is an olefin-containing polymer, the component B being contained in the resin composition in an amount of 1 to 50% by weight.

DETAILED DESCRIPTION OF THE INVENTION

[I] Components

1. Component A (Copolymer of Ethylene and α-Olefin Having a Carbon Number of 4 or More)

(a) Properties of Component A

It is important that a copolymer of ethylene and α-olefin having or more carbon atoms (such α-olefin will be referred to as "C4 or more α-olefin" unless otherwise specified) contained as component A in a resin composition for injection molding according to the present invention have the following properties (1) to (3), preferably (1) to (6):

(1) Melt Flow Rate

The copolymer of ethylene and C4 or more α-olefin used in the present invention should have a melt flow rate (MFR) within a range of from 5 to 150 g/10 min. as measured in accordance with Japanese Industrial Standards (JIS) K7210 (at a temperature of 190° C. under a load of 2.16 kg), preferably from 10 to 120 g/10 min., more preferably from 10 to 100 g/10 min., even more preferably from 10 to 70 g/10 min., and most preferably from 30 to 70 min.

If the melt flow rate of the copolymer exceeds the upper limit of the range of from 5 to 150 g/10 min., this is not preferable because strength may be impaired. A melt flow rate less than the lower limit of this range is not preferable either because formation may become difficult.

(2) Density

The copolymer of ethylene and C4 or more α-olefin used in the present invention should have a density (D) of not more than 0.915 g/cm$^3$ as measured in accordance with JIS K7112, preferably from 0.860 to 0.912 g/cm$^3$, and more preferably from 0.870 to 0.910 g/cm$^3$.

If the density of the copolymer exceeds 0.915 g/cm$^3$, transparency as well as flexibility may be impaired. If the copolymer has too small a density, the copolymer may contain a not negligible amount of components that cause blocking on the surface of a molded product, or a molding.

(3) Peak of Elution Curve Obtained by Temperature Rising Elution Fractionation Obtaining Elution Curve by Temperature Rising Elution Fractionation The elution volume of the copolymer is measured by temperature rising elution fractionation (TREF) performed in the following manner on the basis of the principles described in, for example, "Journal of Applied Polymer Science" (Vol. 26, pages 4217 to 4231, 1981) or "Drafts for Symposium on Polymers" (2P1C09, 1985).

In principle, TREF of a polymer is performed as follows: a polymer to be measured is completely dissolved in a solvent. Thereafter, the resultant solution is cooled, so that a thin polymer layer is formed on the surface of an inactive carrier. In the polymer layer, those components of the polymer which crystallize easily are on the inner side (the side of the layer close to the surface of the inactive carrier) while components which do not crystallize easily are on the outer side.

When the temperature is raised continuously or in a stepwise manner, elution occurs, starting with the non-crystalline components of the relevant polymer, that is, those short-chain branches of the polymer having relatively high degrees of branching, these polymer components being eluted in low-temperature stages. As the temperature increases, those portions having lower branching degrees are eluted gradually. Finally, the branchless straight-chain portion is eluted, thereby completing TREF.

The concentrations of fractions eluted at each temperature are detected, and each elution volume is plotted against elution temperatures to obtain an elution curve in a graphical representation. Such an elution curve enables the component distribution of the polymer to be determined.

The copolymer of ethylene and C4 or more α-olefin used in the present invention should have at least one, and preferably only one, peak of an elution curve obtained by temperature rising elution fractionation (TREF). The main peak should correspond to a temperature of not more than 85° C., preferably not more than 75° C., and more preferably not more than 60° C. The elution curve may indicate substantial elution volume at temperatures other than the temperature to which the main peak corresponds.

If the main peak of the elution curve corresponds to a temperature exceeding 85° C., flexibility and transparency may be impaired.

(4) Elution Volume at Elution Temperature of 40° C. in Temperature Rising Elution Fractionation The copolymer of ethylene and C4 or more α-olefin used in the present invention should preferably have a specific volume Y of elution (in % of the weight thereof with respect to the total weight of the copolymer of ethylene and C4 or more α-olefin serving as the component A) at an elution temperature of 40° C. in temperature rising elution fractionation, the elution volume Y satisfying the following condition:

$$Y \leq -3600D + 3304 \text{ but } Y \leq 100,$$

preferably $$Y \leq -3800D + 3482 \text{ but } Y \leq 100$$

(where D represents the density of the copolymer serving as the component A).

If the copolymer has an elution volume Y falling outside the above range, a molded product tends to suffer from a phenomenon known as "bleedout" on the surface thereof, which is not preferable particularly when the product is required to meet certain food sanitation standards.

(5) Haze

The copolymer of ethylene and C4 or more α-olefin used in the present invention should preferably have a haze of not more than 70% as measured in accordance with JIS K7105 with respect to a sheet of the copolymler serving as the component A which has been formed by injection molding and which has a thickness of 2 mm, preferably not more than 50%, more preferably not more than 40%, and most preferably not more than 30%.

(6) Modulus in Flexure

The copolymer of ethylene and C4 or more α-olefin used in the present invention should preferably have a modulus in flexure of not more than 1500 kgf/cm$^2$ as measured in accordance with JIS K7203, preferably not more than 1200 kgf/cm$^2$, and more preferably not more than 1000 kgf/cm$^2$.

A modulus in flexure of the copolymer which exceeds 1500 kgf/cm$^2$ means that the copolymer has insufficient flexibility, and hence, is not preferable.

(b) Preparation of Copolymer of Ethylene and C4 or More α-Olefin

A copolymer of ethylene and C4 or more α-olefin used in the present invention may be prepared by copolymerizing the main component, ethylene, and the sub-component, C4 or more α-olefin, by using a metallocene catalyst, in particular, a metallocene-alumoxane catalyst or a catalyst such as that disclosed, e.g., in International Patent Laid-Open No. WO92/01723, comprising a mixture of a metallocene compound and a compound, such as the one described below, capable of forming a stable ion by reacting with a metallocene compound. A preparation method disclosed, for example, in any of the following publications may be used: Japanese Patent Laid-Open Nos. 58-19309, 59-95292, 60-35005, 60-35006, 60-35007, 60-35008, 60-35009, 61-130314, and 3-163088; European Patent Laid-Open No. 420436; U.S. Pat. No. 5,055,538; and International Patent Laid-Open No. WO91/04257.

The above-stated compound capable of forming a stable ion by reacting with a metallocene compound is either an ionic compound having ion pairs of cations and anions, or an electrophilic compound. Such a compound forms a stable ion by reacting with a metallocene compound, thereby providing an active species for polymerization.

The above ionic compound is expressed by the following general formula (I):

$$[Q]^{m+}[Y]^{m-} \qquad (1)$$

(m being an integer of 1 or greater)

In the formula (I), Q represents a cation component of the ionic compound. The cation component may be, for example, a carbonium cation, tropylium cation, ammonium cation, oxonium cation, sulfonium cation or phosphonium cation. Also, the cation component may be a metallic cation or an organometallic cation, which cation itself can be easily reduced.

The cation component may be a cation which can give away proton(s), as disclosed in Japanese Patent Publication No. 1-501950, or a cation which does not give away proton(s). Specific examples of cations of the second type include triphenylcarbonium, diphenylcarbonium, cycloheptatrienium, indenium, triethylammonium, tripropylammonium, tributylammonium, N,N-dimethylanilinium, dipropylammonium, dicyclohexylammonium, tripheylphosphonium, trimethylphosphonium, tri(dimethylphenyl)phosphonium, tri(methylphenyl)phosphonium, triphenylsulfonium, triphenyloxonium, triethyloxonium, pyrylium, silver ion, gold ion, platinum ion, palladium ion, mercury ion, and ferrocenium ion.

In the above formula (I), Y represents an anion component of the ionic compound which is transformed into a stable ion through reaction with a metallocene compound. The anion component may be, for example, an organic boron compound anion, organic aluminum compound anion, organic gallium compound anion, organic phosphorus compound anion, organic arsenic compound anion or organic antimony compound anion. Specific examples of such anions include tetraphenyl boron, tetrakis(3,4,5-trifluorophenyl) boron, tetrakis(3,5-di(trifluoromethyl)phenyl) boron, tetrakis(3,5-(t-butyl)phenyl) boron, tetrakis(pentafluorophenyl) boron, tetraphenyl aluminum, tetrakis(3,4,5-trifluorophenyl) aluminum, tetrakis(3,5-di(trifluoromethyl)phenyl) aluminum, tetrakis(3,5-di(t-butyl)phenyl) aluminum, tetrakis(pentafluorophenyl) aluminum, tetraphenyl gallium, tetrakis(3,4,5-trifluorophenyl) gallium, tetrakis(3,5-di (trifluoromethyl)phenyl) gallium, tetrakis(3,5-di(t-butyl) phenyl) gallium, tetrakis(pentafluorophenyl) gallium, tetraphenyl phosphorus, tetrakis(pentafluorophenyl) phosphorus, tetraphenyl arsenic, tetrakis(pentafluorophenyl) arsenic, tetraphenyl antimony, tetrakis(pentafluorophenyl) antimony, decaborate, undecaborate, carbadodecaborate, and decachlorodecaborate.

As stated above, an electrophilic compound may be used instead of an ionic compound, the electrophilic compound comprising a certain kind of Lewis acid capable of forming a stable ion by reacting with a metallocene compound so as to provide an active species for polymerization. The electrophilic compound may be, for example, a halogenated metal compound of varying type, or a metal oxide known as a solid acid. Specifically, halogenated magnesium, inorganic oxides of the Lewis-acid type, or the like may be used.

α-Olefin

α-Olefin having a carbon number of 4 or greater, which serves as the sub-component of the copolymer, may comprise, for example, 1-butene, 1-pentene, 1-hexene, 1-octene, 1-heptene, 4-methylpentene-1, 4-methylhexene-1, or 4,4-dimethylpentene-1. Among olefins having a carbon number of 4 or greater, those having a carbon number of 4 to 12 are preferable, and those having a carbon number of 6 to 10 are more preferable. It is preferable that 2 to 60% by weight (percentages by weight will hereinafter be abbreviated to "wt %"), preferably 5 to 50 wt %, more preferably 10 to 30 wt %, of one or more such α-olefins be copolymerized with 40 to 98 wt %, preferably 50 to 95 wt %, and more preferably 70 to 90 wt %, of ethylene.

Copolymerization of Ethylene and C4 or More α-Olefin

Methods which may be used to copolymerize ethylene and C4 or more α-olefin comprise, for example, gaseous phase methods, slurry methods, solution methods or high-pressure ion polymerization methods. Among these, solution methods and high-pressure ion polymerization methods are preferable, with preparation by a high-pressure ion polymerization method being particularly preferable.

The above-mentioned high-pressure ion polymerization method is a method for producing an ethylene-based polymer, such as that disclosed, e.g., in Japanese Patent Laid-Open No. 56-18607 or 58-225106, and the method adopts reaction conditions comprising a pressure of not less than 100 kg/cm$^2$, preferably a pressure within a range of from 300 to 2000 kg/cm$^2$, and a temperature of not less than 125° C., preferably a temperature within a range of from 130° to 250° C., and more preferably from 150° to 200° C.

2. Component B (Olefin-containing Polymer)

(i) Resins Which May Be Used as Component B

An olefin-containing polymer serving as component B of a resin composition for injection molding according to the present invention may be a polyolefin different from component A. Examples which may be used as such polyolefins include: an ethylene-containing polymer, such as high-density polyethylene, low-density polyethylene or linear low-density polyethylene; and a propylene-containing polymer. Among these, low-density polyethylene and propylene-containing polymer are preferable. Particularly preferable is low-density polyethylene, and, among various low-density polyethylenes, high-pressure low-density polyethylene obtained by a high-pressure polymerization method, is preferable. Two or more of these polyolefins can be used.

Examples usable as component B will be described below.

(ii) High-pressure Low-density Polyethylene

When the component B mixed with a copolymer of ethylene and C4 or more α-olefin serving as the component A of the resin composition for injection molding according to the present invention, comprises a high-pressure low-density polyethylene, the high-pressure low-density polyethylene should preferably have the following properties (a) to (e):

(a) Melt Flow Rate

The high-pressure low-density polyethylene serving as component B should preferably have a melt flow rate (MFR) within a range of from 0.1 to 100 g/10 min. as measured in accordance with JIS K7210 (at a temperature of 190° C. under a load of 2.16 kg), preferably from 1 to 50 g/10 min., and more preferably from 10 to 50 g/10 min.

If the melt flow rate of the high-pressure low-density polyethylene exceeds the upper limit of the range of from 0.1 to 100 g/10 min., strength may be impaired. If the melt flow rate is less than the lower limit of this range, it may be difficult for the component B to be mixed with the component A.

(b) Density

The high-pressure low-density polyethylene serving as component B should preferably have a density within a range of from 0.915 to 0.93 g/cm$^3$ as measured in accordance with JIS K7112, preferably from 0.918 to 0.927 g/cm$^3$, and more preferably from 0.919 to 0.923 g/cm$^3$.

If the density of the high-pressure low-density polyethylene exceeds the upper limit of the range of from 0.915 to 0.93 g/cm$^3$, transparency may be impaired. If the density is smaller than the lower limit of this range, the polyethylene may contain an appreciable amount of components that cause blocking on the surface of a molding.

(c) Memory Effect (ME)

The high-pressure low-density polyethylene should preferably have a memory effect (3 grams) of not less than 1.3, preferably not less than 1.6, and more preferably not less than 1.8.

A memory effect lower than 1.3 is not preferable because it reduces the extent to which moldability is improved.

Memory effect (3 grams) is measured in the following manner by using a melt indexer such as that used in JIS K7210, and by setting measurement conditions comprising a cylinder temperature of 240° C., and a constant rate extrusion amount of 3 g/min:

The desired sample is charged into the apparatus, and only the piston is placed on the sample. After 6 minutes have passed, the prescribed extrusion rate is applied. Then, a graduated cylinder containing ethyl alcohol is placed immediately below the orifice of the die, so that a straight extrudate can be collected.

The diameter $D_1$ of the collected extrudate is measured with a micrometer, and the memory effect ME of the sample is calculated by the following formula where the diameter of the orifice is represented as $D_0$:

$$ME=D_1/D_0$$

(d) Q Value

The high-pressure low-density polyethylene serving as component B should preferably have a specific Q value (the ratio Mw/Mn of the weight-average molecular weight Mw with respect to the number-average molecular weight Mn) obtained by size exclusion chromatography (SEC), the Q value being not less than 5, preferably not less than 7, and more preferably not less than 9.

Too small a Q value is not preferable because it reduces the extent of moldability improvement.

(e) Activation Energy

The high-pressure low-density polyethylene serving as component B should preferably have a specific activation energy (Ea) when the shear rate calculated from the viscosity of the high-pressure low-density polyethylene is 24 $sec^{-1}$, the activation energy being not less than 5 KJ/mol, preferably not less than 8 KJ/mol, and more preferably not less than 12 KJ/mol.

Too small an activation energy is not preferable because it reduces the extent to which spiral flow is improved.

The activation energy of the high-pressure low-density polyethylene is calculated by a method described in such document as "Rheology" (page 604; by Tsurutaro Nakagawa and Hirotaro Kanbe; published by Misuzu Shobo in Japan) or "Rheology; Kodansha Modern Science Series 18" (pages 160 to 161; by Shizuo Hayashi; published by Kodansha in Japan). In this method, the activation energy is calculated by the Arrhenius formulas or Andrade formulas expressing the relationship between viscosity coefficient and temperature. Specifically, a capillograph-type viscometer is used to measure viscosity at each of temperatures 160° C. (433 K), 190° C. (563 K) and 230° C. (503 K). A viscosity curve is obtained indicating changes in viscosity with changes in shear rate at each temperature, and a shear viscosity ($\eta$) corresponding to the shear rate of 24 $sec^{-1}$ is obtained from each viscosity curve. Then, the shear viscosity data is used to prepare a graph having an abscissa representing 1/T (T: each measurement temperature in the Kelvin temperature scale) and an ordinate representing log($\eta$), and the logarithmic value (log (A)) of the intercept is read from the graph. The thus obtained values $\eta$ and A are used in the following formulas to calculate the relevant activation energy (Ea):

$$\eta = Ae^{-Ea/RT} \rightarrow \log(\eta) = \log(A) - Ea/RT$$

(where $\eta$: shear viscosity (poise); A: frequency factor; Ea: activation energy (KJ/mol); R: gas constant (8.3145 J/K·mol); and T: absolute temperature (K))

(f) Specific Examples of High-pressure Low-density Polyethylene Which May Be Used A high-pressure low-density polyethylene to be used as component B may be suitably selected from among commercially available products having the above-described properties.

(iii) Propylene-containing Polymer

A propylene-containing polymer according to the present invention which may be contained as the component B in the resin composition for injection molding, is either a homopolymer of propylene, or a random or block copolymer of propylene with a relatively small amount of α-olefin. The method for preparing such a propylene-containing polymer is not limited specifically. In general, however, a propylene-containing polymer which may be used in the present invention is prepared by a slurry polymerization method, a gaseous phase polymerization method, a bulk polymerization method, a solution polymerization method, or a combination of one or more of these methods, by using a so-called Ziegler-Natta catalyst which is a combination of an organic component and a titanium-containing solid transition metal component, in particular, a catalyst containing an organic metal component comprising an organic aluminum compound, and a transition metal component comprising a solid component or titanium trichloride which in turn contains titanium, magnesium and halogen as its essential components and also contains an electron donative compound as its optional component. Such preparation provides either a propylene homopolymer obtained by homopolymerizing propylene in a single or a plurality of stages, or a propylene-ethylene copolymer obtained by copolymerizing, in a single or a plurality of stages, propylene with α-olefin having 2 carbons or 4 to 12 carbons, preferably, ethylene.

Although the propylene-containing polymer may be either a random polymer or a block polymer, a block polymer is preferable. The propylene-containing polymer may comprise a combination of two or more propylene-containing polymers.

When a propylene-containing polymer as described above serves as the component B of the resin composition according to the present invention, the propylene-containing polymer should preferably have the following properties (a) to (d):

(a) Melt Flow Rate

The propylene-containing polymer serving as component B should preferably have a melt flow rate (MFR) within a range of from 1 to 100 g/10 min. as measured in accordance with JIS K7210 (at a temperature of 230° C. under a load of 2.16 kg), preferably from 5 to 50 g/10 min., and more preferably from 10 to 40 g/10 min.

Too high a melt flow rate of the propylene-containing polymer is not preferable because it impairs strength. Too low a melt flow rate is not preferable either because it impairs spiral flow.

(b) Activation Energy (Ea)

The propylene-containing polymer serving as component B should preferably have a specific activation energy (Ea) when the shear rate calculated from the viscosity of the propylene-containing polymer is 24 $sec^{-1}$, the activation energy being not less than 8 KJ/mol, preferably not less than 10 KJ/mol, and more preferably not less than 12 KJ/mol.

Too small an activation energy is not preferable because it reduces the extent to which spiral flow is improved.

The activation energy of the propylene-containing polymer is measured by the same method as that described above except that temperatures for measuring viscosity are set to 190° C. (463 K), 230° C. (503 K) and 260° C. (533 K).

(c) α-Olefin Content in Propylene-containing Polymer

When the propylene-containing polymer serving as component B comprises a propylene-α-olefin copolymer, the copolymer should preferably contain α-olefin in a specific amount. When the propylene-α-olefin copolymer is a block copolymer, it should preferably contain α-olefin in an amount within a range of from 1 to 40 wt % with respect to the total weight of the copolymer, more preferably from 1 to 25 wt %, even more preferably from 2 to 20 wt %, and most preferably from 3 to 15 wt %. When the propylene-α-olefin copolymer is a random copolymer, it should preferably contain olefin in an amount of not more than 10 wt % with respect to the total weight of the copolymer, more preferably in an amount within a range of from 0.5 to 7 wt %.

(d) Properties detected by Pulse Nuclear Magnetic Resonance Method

The propylene-containing polymer serving as component B should preferably have specific properties of crystalline component (I), non-crystalline bound component (II) and non-crystalline unbound component (III) detected in the propylene-containing polymer by the pulse nuclear magnetic resonance (pulse NMR) method described in the following document: "Multiple-Pulse Nuclear Magnetic Resonance on Some Crystalline Polymers" (Polymer Journal Vol. 3, No. 4; pages 448 to 462; 1972; by K. Fujimoro, T. Nishi and R. Kado). That is, the crystalline component (I) and the non-crystalline bound component (II) satisfy a ratio (I)/(II) between weights thereof that is within a range of from 1.5 to 4, preferably from 2 to 3.5, while the non-crystalline unbound component (III) weighs 3 to 30%, preferably 5 to 20%, of the total weight of the propylene-containing polymer.

If the ratio (I)/(II) is smaller than the lower limit of the range of from 1.5 to 4, heat resistance may be impaired. If the ratio (I)/(II) exceeds the upper limit of this range, tensile elongation properties may be insufficient. If the non-crystalline unbound component (III) is contained in an amount less than the lower limit of the range of 3 to 30 wt %, impact strength may be impaired. If the content of the non-crystalline unbound component (III) exceeds the upper limit of this range, a molding may have a surface vulnerable to damage, and thus have reduced value as a product.

(e) Specific Examples of Propylene-containing Polymer Which May Be Used

A propylene-containing polymer to be used as component B may be suitably selected from among commercially available products having the above-described properties.

(iv) Linear Low-density Polyethylene

When a linear low-density polyethylene is contained as the component B of the resin composition according to the present invention, the linear low-density polyethylene should preferably have the following properties (a) to (d):

(a) Melt Flow Rate

The linear low-density polyethylene serving as component B should preferably have a melt flow rate (MFR) within a range of from 1 to 100 g/10 min. as measured in accordance with JIS K7210 (at a temperature of 190° C. under a load of 2.16 kg), preferably from 1 to 50 g/10 min., and more preferably from 10 to 40 g/10 min.

Too high a melt flow rate of the linear low-density polyethylene is not preferable because it may impair strength. Too low a melt flow rate is not preferable either because it may impair spiral flow.

(b) Density

The linear low-density polyethylene serving as component B should preferably have a density within a range of from 0.90 to 0.935 g/cm$^3$ as measured in accordance with JIS K7112, preferably from 0.91 to 0.93 g/cm$^3$, and more preferably from 0.915 to 0.925 g/cm$^3$.

Too high a density of the linear low-density polyethylene is not preferable because it may impair transparency. Too low a density of the linear low-density polyethylene is not preferable either because the polyethylene may contain a not negligible amount of components that cause blocking on the surface of a molding.

(c) Peak of Elution Curve Obtained by Temperature Rising Elution Fractionation

The linear low-density polyethylene serving as component B should preferably have at least one, preferably at least two, peaks of elution volume indicated by an elution curve obtained by temperature rising elution fractionation (TREF), at least one of the peaks corresponding to a temperature of not less than 90° C.

(d) Q Value

The linear low-density polyethylene serving as component B should preferably have a specific Q value (the ratio Mw/Mn of the weight-average molecular weight Mw with respect to the number-average molecular weight Mn), the Q value being within a range of from 2.5 to 6, preferably from 2.7 to 4.

(e) Preparation of Linear Low-density Polyethylene

A linear low-density polyethylene according to the present invention which may be contained as the component B in the resin composition for injection molding, is a copolymer of ethylene and another α-olefin, which copolymer is prepared by copolymerizing ethylene with an α-olefin such as propylene, 1-butene, 1-pentene, 1-hexene, 1-octene, 1-heptene, 4-methylpentene-1, 4-methylhexene-1, or 4,4-dimethylpentene-1. Among such a α-olefins, those having a carbon number of 4 to 12 are preferable with 1-hexene being particularly preferable.

Methods which may be used to prepare the linear low-density polyethylene are not limited specifically. However, preparation may be performed by using a so-called Ziegler type catalyst, and methods such as gaseous phase methods, slurry methods, solution methods or high-pressure ion polymerization methods.

3. Proportion of Components A and B in Resin Composition

A copolymer of ethylene and C4 or more α-olefin, serving as component A, and an olefin-containing polymer, serving as component B, should be contained in a resin composition according to the present invention at a certain proportion between the individual contents (in wt %) of the components A and B in the resin composition, the proportion being within a range of from component A: component B=50:50 wt % to 99:1 wt %, preferably within a range of from component A: component B=50:50 wt % to 95:5 wt %, more preferably within a range of from component A: component B=60:40 wt % to 90:10 wt %, and most preferably within a range of from component A: component B=70:30 wt % to 90:10 wt %.

If the amount of component B is too large, balance between various properties, such as flexibility and impact strength, may be impaired. And, if it is in too small, the extent to which moldability is improved may be reduced.

4. Other Additives

A resin composition for injection molding according to the present invention may contain auxiliary additives generally used in a resin composition, such as antioxidants, heat stabilizers, light stabilizers, ultraviolet absorbers, lubricants, and/or antistatic agents, so long as additives are contained in an amount within a range that does not involve any substantial reduction in the effects achievable with the present invention. The above list of additives may include pigments, etc. when necessary.

5. Properties of Resin Composition

A resin composition for injection molding according to the present invention obtained as described above should preferably have the following properties:

When the resin composition is injection-molded into a molding (specifically, an injection-molded sheet having a thickness of 2 mm), the molding should preferably have a haze of not more than 70% as measured in accordance with JIS K7105, preferably not more than 50%, more preferably not more than 40%, even more preferably not more than 30%, and most preferably not more than 25%.

The resin composition for injection molding should preferably have a melt flow rate within a range of from 5 to 100 g/10 min., and more preferably from 5 to 50 g/10 min.

The resin composition for injection molding should preferably have a memory effect of not less than 1.1, and preferably not less than 1.2.

[II] Production of Injection-molded Product

A resin composition for injection molding according to the present invention is formed into pellets by melting and kneading the resin composition by a uniaxial or biaxial extruder, a kneader-blender, a Brabender Plastograph, a Banbury mixer, rolls, or the like. The pellets are used to form moldings by an injection molding machine.

Injection molding of the moldings may be performed by using a normal injection molding machine and adopting normal conditions. Thus, the applicability of the present invention is not specifically limited by condition, etc. of injection molding.

EXAMPLES

The present invention will be described more specifically by examples thereof.

[I] Methods for Property Measurement and Evaluation

Before entering into the description of the examples of the present invention and comparative examples, which will be given in section [II], certain methods used to measure various properties of these examples and to evaluate these examples will be outlined.

1 Methods for Property Measurement (1) Melt Flow Rate: JIS K7210 ethylene polymer: at 190° C. under a load of 2.16 kg propylene polymer: at 230° C. under a load of 2.16 kg (2) Density: JIS K7112

(3) Elution Curve: In the present invention, the peak of an elution curve obtained by temperature rising elution fractionation (TREF) is checked. TREF is performed in principle as follows: The relevant polymer is completely dissolved in a solvent at a high temperature. Thereafter, the resulting solution is cooled, so that a thin polymer layer is formed on the surface of an inactive carrier. Then, temperature is raised continuously or in a stepwise manner, and eluted fractions of the polymer are collected. The concentrations of fractions eluted at each temperature are successively detected, and each elution volume is plotted against elution temperatures to obtain an elution curve in a graphical representation. The component distribution of the polymer can be determined on the basis of the elution curve. In the present invention, the peak of such an elution curve is checked.

An elution curve of a sample is obtained in the following manner:

The apparatus used for measurement is a cross fractionating apparatus "CFC T150A"(produced by Mitsubishi Petrochemical Co., Ltd.), and measurement is performed in accordance with the method described in an operation manual attached to the apparatus.

The cross fractionating apparatus includes two on-line connected sections, that is, a temperature rising elution fractionation (TREF) mechanism for fractionating a sample by utilizing differences in dissolution temperature between various portions thereof, and a size exclusion chromatography (SEC) section for separating each fractionated portion by the size of molecules.

First, a sample to be measured is dissolved in a solvent of o-dichlorobenzene at a temperature of 140° C. to prepare a sample solution having a sample concentration of 4 mg/ml. The sample solution is charged into the sample loop of the apparatus. Thereafter, the apparatus automatically performs measurements at set conditions.

0.4 ml of the sample solution retained in the sample loop is fed to a TREF column (a stainless-steel column attached to the apparatus, the column being filled with glass beads serving as an inactive carrier, and having an inner diameter of 4 mm and a length of 150 mm). Then, the fed sample is cooled from 140° C. to 0° C. at a cooling speed of 1° C./min., thereby causing the sample to be coated on the surface of the inactive carrier. In this process, a polymer layer is formed on the surface of the inactive carrier in such a manner that components which are relatively highly crystalline (components capable of being crystallized easily) enter first into the layer, and then components which are relatively lowly crystalline (components not capable of being crystallized easily) add to the layer. After the TREF column has been held at 0° C. for 30 min., a 2-ml fraction eluted at 0° C. is fed from the TREF column to a SEC column unit comprising three SEC columns "AD80M/S" (trade name; produced by Showa Denko K.K.) at a flow rate of 1 ml/min.

While the SEC section performs separation by molecular size, the temperature of the TREF column is raised to a subsequent elution temperature (5° C., in this case), and maintained at this temperature for approximately 30 min. Thus, the SEC column unit subsequently performs the separation of each eluted fraction at a cycle of 39 min. The elution temperature is raised stepwise from 0° C. to 5°, 10°, 15°, 20°, 25°, 30+, 35°, 40°, 45°, 49°, 52°, 55°, 58°, 61°, 64°, 67°, 70°, 73°, 76°, 79°, 82°, 85°, 88°, 91°, 94°, 97°, 100°, 102°, 120°, and 140° C.

The portions of the sample solution separated by the SEC column unit by molecular size are processed by an infrared spectrophotometer attached to the apparatus. The infrared spectrophotometer measures, through detection with a wavelength of 3.42μ on the basis of stretching vibration of methylene, the absorbance of each separated portion that corresponds to the concentration of the polymer in the particular portion. Thus, chromatograms concerning individual fractions eluted at various elution temperatures are obtained.

Thereafter, data processing software provided in the apparatus is used. Specifically, a base line is drawn in each of the chromatograms resulting from the above measurement, and the following calculations are performed. The individual areas of the chromatograms are integrated, and an integral elution curve is obtained. Further, the integral elution curve is differentiated with respect to temperature, thereby obtaining a differential elution curve. The graphs resulting from these calculations are than output to a printer connected with the apparatus.

In the thus output graph of the differential elution curve, the abscissa represents the elution temperature with a dimension of 89.3 mm of the abscissa corresponding to a change through 100° C., and the ordinate represents the differential elution volume with a dimension of 76.5 mm of the ordinate corresponding to a change through 0.1 when the entire integral elution volume is 1.0 and each differentiated quantity consists of a change in elution volume with a change in temperature by (4) Q Value: An apparatus for size exclusion chromatography (SEC) is used for measuring each Q value (weight-average molecular weight/number-average molecular weight) under the conditions shown below. In this measurement, a universal calibration curve is obtained by using monodisperse polystyrene, and the molecular weights are calculated as those of linear polyethylene:

Apparatus type: Waters Model 150C GPC

Solvent: o-dichlorobenzene

Flow rate: 1 ml/min.

Temperature: 140° C.

Measurement concentration: 2 mg/ml

Charged amount: 200 µl

Columns: three columns ("AD80M/S":(trade name); produced by Showa Denko K.K.)

(5) Memory Effect (ME): A melt indexer of the type described in JIS K7210 is used under measurement conditions comprising a cylinder temperature of 240° C. and a constant rate extrusion amount of 3 g/min.

Each sample is charged into the apparatus, and only the piston is placed on the sample. After the passage of 6 minutes, the prescribed extrusion rate is applied. Then, a graduated cylinder containing ethyl alcohol is placed immediately below the orifice of the die, and a straight extrudate is collected. The diameter $D_1$ of the collected extrudate is measured with a micrometer, and the memory effect ME of the sample is calculated by the following formula:

$$ME = D_1/D_0 \quad (D_0: \text{the diameter of the orifice})$$

(6) Viscosity: The viscosity of each sample is measured by using a "Capillograph 1B PMD-C" (produced by Toyo Seiki Seisakusho K.K.) having capillaries with a diameter of 1 mm and a length of 10 min. Each extrusion speed, i.e.; 2.5, 5, 10, 20, 50, 100 and 200 m/min. is automatically set, and viscosity at various temperatures is measured.

(7) Pulse Nuclear Magnetic Resonance (NMR) Method:

Solid echo on each sample at a temperature of 30° C. is measured by using "JEOL-GSX270"(produced by Nihon Denshi K.K.), and employing pulses having a pulse width of 1.8 µs at 90° C.

The resulting magnetization attenuation curve is logarithmically plotted, and components (I), (II) and (III) are separated by the method described in the above-mentioned document ("Multiple-Pulse Nuclear Magnetic Resonance on Some Crystalline Polymers"; Polymer Journal Vol. 3, No. 4; pp 448 to 462; 972; by K. Fujimoro, T. Nishi and R. Kado). Then, the percentage by weight of each component with respect to the total weight of the propylene-containing polymer is calculated to determine the ratio (I)/(II) as well as the content of component (III).

2 Methods for Evaluation (1) Spiral Flow: Each sample (resin composition) is injection-molded by a spiral-shaped mold under the conditions stated below. The mold has a flow channel with a thickness of 2 mm, a width of 6 mm on the fixed surface of the mold, and a width of 4 mm on the opposite surface of the mold. A plurality of shallow notches, with an interval of 5 mm therebetween, are formed on the surface defining the flow channel, so that a part of the scale can be transferred to each specimen. On the basis of the transferred part of the scale, the distance over which the sample has flowed in the mold, is measured.

Apparatus type: Toshiba IS-90B

Cylinder temperature: 240° C.

Mold temperature: 40° C.

Injection pressure: 800 kg/cm$^2$

Screw speed: 70 rpm

Cushion amount: 5 mm (2) Modulus in Flexure: JIS K7203

(3) Haze: JIS K7105 (an injection-molded sheet having a thickness of 2 mm)

(4) Tensile Strength at Break (kg/cm$^2$): JIS K7113

(5) Tensile Impact Strength (kg/cm$^2$):

A tester having the following properties is used:

Capacity: 20 kgf cm

Magnitude of impact: 3.4 m/see

Hammer lift angle: 150° C.

Chuck type: cross-head

A pressed sheet made of each sample (resin composition) and having a thickness of 0.5 mm is prepared by using a gradual cooling method and a temperature of 160° C. A dumbbell specimen having a length of 50 mm and a width of 10 mm (with a maximum width of 3 mm in the center), is stamped from the sheet, and the thickness of the specimen is measured. The tester is operated first with no specimen on it so as to obtain a free impact value (F). Then, the specimen is mounted, hit with the hammer, and the tensile-impact energy (E) is read. The tensile impact strength of the sample is calculated by the following formula:

$$\text{Tensile Impact Strength} = (E-F)/(a \times b)$$

where

E: tensile impact energy (kgf cm)

F: free impact value (kgf cm)

a: specimen thickness (cm)

b: specimen width (cm)

(6) Izod Impact Strength at −30° C.: JIS K7110

(7) Brittle Temperature: Measurement is performed by a method developed by the Institute for Telecommunications Sciences (notched depth: 0.3 mm).

(8) Rockwell hardness: ASTM D785 A method (R hardness)

[II] EXAMPLES

Example 1

1 Preparation of Copolymer of Ethylene and C4 or more α-Olefin Used in Example 1 to 8 and Comparative Example 6 (Component A)

A catalyst was prepared using the method described in Japanese Patent Laid-Open No. 61-130314. Specifically, 2.0 millimols of complex ethylene-his(4, 5, 6, 7-tetrahydroindenyl) zirconium dichloride was mixed with methyl alumoxane (produced by Toyo Stauffer K.K.) in an amount of 1000 times the molar amount of the complex, and the resultant mixture was diluted in toluene to prepare 10 liters of a catalyst solution. Then, polymerization was performed in the following manner by using the catalyst.

A mixture of ethylene and 1-hexene was supplied into an agitation autoclave type continuous reactor having an inner volume of 1.5 liters in such a manner that the proportion of 1-hexene was 83% of the total weight of the mixture. The pressure within the reactor was maintained at 1600 kg/cm², and reaction was performed at 165° C.

After the reaction had completed, an ethylene-1-hexene copolymer ($C_2$-$C_6$ ①) which contained 1-hexene in an amount of 20% of the total weight of the copolymer and which was to serve as component A, was obtained. The copolymer had the following properties: a melt flow rate (MFR) of 13 g/10 min.; a density of 0.898 g/cm³; a TREF elution curve having a single peak corresponding to a temperature of 55° C., and indicating substantial elution volume at other temperatures; and an elution volume at 40° C. of 15 wt %.

2. Preparation of Olefin-containing Polymer Used in Examples 1 to 8 and Comparative Examples 1 to 4 (Component B)

Different ones of the following substances (a) to (g) were used as olefin-containing polymers to serve as component B in Example 1 and component B in each of Examples 2 to 8 and Comparative Examples 1 to 4, which will be described later. The substances (a) to (g) had the following properties:

(a) high-pressure low-density polyethylene (HPLD ①): melt flow rate (MFR): 20 g/10 min.; density: 0.918 g/cm³; memory effect (ME): 1.5; Q value: 7; and activation energy (Ea): 16 KJ/mol (b) high-pressure low-density polyethylene (HPLD ②): melt flow rate (MFR): 40 g/10 min.; density: 0.923 g/cm³; memory effect (ME): 1.3; Q value: 11; and activation energy (Ea): 19 KJ/mol (c) high-pressure low-density polyethylene (HPLD ③): melt flow rate (MFR): 1 g/10 min.; density: 0.923 g/cm³; memory effect (ME): 2.0; Q value: 7; and activation energy (Ea): 10 KJ/mol (d) propylene-ethylene block copolymer (PP ①): melt flow rate (MFR): 10 g/10 min.; Ea: 12 KJ/mol; olefin content: 2 wt %; ratio (I)/(II) in weight between components (I) and (II) determined by a pulse NMR method: 2.5; and content of component (III): 6 wt %

(e) propylene-ethylene block copolymer (PP ②): melt flow rate (MFR): 30 g/10 min.; Ea: 16 KJ/mol; olefin content: 4 wt %; ratio (I)/(II) in weight between components (I) and (II) determined by a pulse NMR method: 2.5; and content of component (III): 8 wt %

(f) propylene homopolymer (PP ③): melt flow rate (MFR): 11 g/10 min.; Ea: 13 KJ/mol; ratio (I)/(II) in weight between components (I) and (II) determined by a pulse NMR method: 2.4; and content of component (III): 5 wt %

(g) linear low-density polyethylene (ethylene-1-butene copolymer prepared by using a Ziegler catalyst: LLDPE ①): melt flow rate (MFR): 30 g/10 min.; density: 0.919 g/cm³; number of TREF peaks: 2; temperatures to which the peaks correspond: 78° C. and 92° C.; Q value: 4; and activation energy (Ea): 12 KJ/mol Compounding and Molding In Example 1, the above component A (ethylene-hexene copolymer) and the component B shown in Table 1 were dry-blended together at a certain ratio, and the resultant mixture was melted in a uniaxial extruder (diameter: 40 mm) at a temperature of 160° C., thereby obtaining pellets. Some of the pellets were formed into a pressed sheet, and the tensile impact strength of the pressed sheet was measured.

Then, the other pellets were charged in an injection molding machine SJ-45 (produced by Meiki Seisakusho K.K.: 15 oz-150 t; 45 mmϕ in-line screw type), and injection-molded into molded sheets under the following conditions:

Mold type classified in accordance with JIS: JIS No.2
Molding temperature: 200° C.
Mold temperature (Cooling temperature): 40° C.
Screw speed: 80 rpm
Injection Pressure:
  Mold clamping pressure: 95 to 105 kg/cm²
  Primary injection pressure: 400 kg/cm²
  Secondary injection pressure: 300 kg/cm²
Injection time:
  Primary injection pressure application time: 5 sec
  Secondary injection pressure application time: 10 sec
  Cooling time: 20 sec The thus obtained injection-molded sheets were evaluated. The results of The evaluation are shown in the single Table 1.

Examples 2 to 8 and Comparative Examples 1 to 3 and 6

Resin compositions serving as other examples of the present invention and comparative examples were each produced in the same manner as that in Example 1 except that, in each of the above examples, component A and component B having the properties shown in Table 1 were used, and that the compounding ratio, etc. were changed. The resultant resin compositions were formed and evaluated as in Example 1.

The results of the evaluation are also shown in Table 1.

Comparative Examples 4 and 5

Other resin compositions for comparison were each obtained in the same manner as that in Example 1 except that component A was substituted by a linear low-density polyethylene (LLDPE ②) prepared by using a Ziegler catalyst, the polyethylene LLDPE ② had a density of 0.922 g/cm³ and a melt flow rate of 16 g/10 min. The thus obtained resin compositions were formed and evaluated as in Example 1. The results of the evaluation are shown in Table 1.

Examples 9 and 10

Other resin compositions of the present invention were each obtained in the same manner as that in Example 1 except that component A and component B were substituted by the following substances:

Component A

An ethylene-1-hexene copolymer ($C_2$-$C_6$ ②) containing 28 wt % of 1-hexene was prepared by polymerizing ethylene and 1-hexene in the same manner as that in Example 1 except that the pressure within the reactor was maintained at 1500 kg/cm², and reaction was performed at 180° C. The copolymer had the following properties: a melt flow rate (MFR) of 31 g/10 min.; a density of 0.892 g/cm³; a TREF elution curve having a single peak corresponding to a temperature of 43° C., and indicating substantial elution volume at other temperatures; and an elution volume at 40° C. of 46 wt %.

Component B

One of substances (h) or (i) having the following properties was used as component B in each of Examples 9 and 10.

(h) high-pressure low-density polyethylene (HPLD ④): melt flow rate (MFR): 17 g/10 min.; density: 0.917 g/cm³; and memory effect (ME): 2.0

(i) high-pressure low-density polyethylene (HPLD ⑤): melt flow rate (MFR): 30 g/10 min.; density: 0.918 g/cm$^3$; and memory effect (ME): 1.7

The thus obtained resin compositions were formed and evaluated as in Example 1. The results of the evaluation are shown in Table 2.

As has been described above, a resin composition for injection molding according to the present invention has excellent transparency and excellent strength at normal and low temperatures while possessing good balance between strength and rigidity. Accordingly, the resin composition is very usable as a material lot flexible-resin food containers of the Tupperware (registered trademark) type. In addition, since the resin composition is a material that is as transparent as vinyl chloride resins and is capable of exhibiting excellent strength at low temperatures, the resin composition can be used as a material for producing containers for pharmaceutical products, etc. which are applicable to freeze-preservation, and a material for other fields where high transparency and ability to be used at low temperatures are required. Thus, the resin composition according to the present invention can be of great industrial value.

Japanese Patent Application 5-41375 is hereby incorporated by reference.

TABLE 1

|  | Example No. | | | |
| --- | --- | --- | --- | --- |
|  | 1 | 2 | 3 | 4 |
| Component |  |  |  |  |
| A | C$_2$–C$_6$① | C$_2$–C$_6$① | C$_2$–C$_6$① | C$_2$–C$_6$① |
| B | HPLD① | HPLD② | HPLD① | PP① |
| Ratio of Comp. A:Comp. B Composition | 70:30 | 70:30 | 85:15 | 70:30 |
| MFR (g/10 min.) | 13 | 15 | 13 | 10 |
| ME | 1.2 | 1.2 | 1.2 | 1.9 |
| Haze (%) | 18 | 25 | 15 | 35 |
| Properties |  |  |  |  |
| Rockwell hardness | 56 | 56 | 60 | 57 |
| Tensile strength at break (kg/cm$^2$) | N | 320 | N | 250 |
| Izod impact strength at –30° C. (kgf · cm/cm$^2$) | N | N | N | N |
| Modulus in flexure (kgf/cm$^2$) | 700 | 700 | 600 | 2200 |
| Brittleness temperature (°C.) | –50 | –50 | –55 | –30 |
| Tensile impact strength (kg/cm$^2$) | 900 | 900 | N | 240 |
| Spiral flow (mm) | 500 | 520 | 460 | 520 |

|  | Example No. | | | |
| --- | --- | --- | --- | --- |
|  | 5 | 6 | 7 | 8 |
| Component |  |  |  |  |
| A | C$_2$–C$_6$① | C$_2$–C$_6$① | C$_2$–C$_6$① | C$_2$–C$_6$① |
| B | PP② | PP③ | LLDPE① | HPLD③ |
| Ratio of Comp. A:Comp. B Composition | 70:30 | 70:30 | 70:30 | 70:30 |
| MFR (g/10 min.) | 12 | 10 | 16 | 7 |
| ME | 2.1 | 1.7 | 1.2 | 1.7 |
| Haze (%) | 40 | 40 | 40 | 28 |
| Properties |  |  |  |  |
| Rockwell hardness | 59 | 60 | 34 | 45 |

TABLE 1-continued

| Tensile strength at break (kg/cm$^2$) | 260 | 170 | N | 320 |
| --- | --- | --- | --- | --- |
| Izod impact strength at –30° C. (kgf · cm/cm$^2$) | N | N | N | N |
| Modulus in flexure (kgf/cm$^2$) | 3400 | 2400 | 800 | 800 |
| Brittleness temperature (°C.) | –30 | –30 | –55 | –50 |
| Tensile impact strength (kg/cm$^2$) | 100 | 100 | 800 | N |
| Spiral flow (mm) | 560 | 520 | 500 | 440 |

|  | Comparative Example No. | | | |
| --- | --- | --- | --- | --- |
|  | 1 | 2 | 3 | 4 |
| Component |  |  |  |  |
| A | — | — | — | LLDPE② |
| B | HPLD① | LLDPE① | PP① | HPLD① |
| Ratio of Comp. A:Comp. B Composition | 0:100 | 0:100 | 0:100 | 70:30 |
| MFR (g/10 min.) | 20 | 30 | 10 | 15 |
| ME | 1.5 | — | — | 1.3 |
| Haze (%) | 77 | 80 | 92 | 87 |
| Properties |  |  |  |  |
| Rockwell hardness | 25 | 100 | 100 | 100 |
| Tensile strength at break (kg/cm$^2$) | 100 | 70 | 300 | 110 |
| Izod impact strength at –30° C. (kgf · cm/cm$^2$) | 2 | 10 | 2 | N |
| Modulus in flexure (kgf/cm$^2$) | 1100 | 1600 | 10000 | 1700 |
| Brittleness temperature (°C.) | –6 | –30 | –12 | –15 |
| Tensile impact strength (kg/cm$^2$) | 90 | 20 | 30 | 60 |
| Spiral flow (mm) | 800 | 700 | 580 | 480 |

|  | Comparative Example No. | |
| --- | --- | --- |
|  | 5 | 6 |
| Component |  |  |
| A | LLDPE② | C$_2$–C$_6$① |
| B | — | — |
| Ratio of Comp. A:Comp. B Composition | 100/0 | 100:0 |
| MFR (g/10 min.) | 16 | 13 |
| ME | — | — |
| Haze (%) | 83 | 29 |
| Properties |  |  |
| Rockwell hardness | 100 | 70 |
| Tensile strength at break (kg/cm$^2$) | 110 | N |
| Izod impact strength at –30° C. (kgf · cm/cm$^2$) | N | N |
| Modulus in flexure (kgf/cm$^2$) | 1700 | 600 |
| Brittleness temperature (°C.) | –40 | –60 |
| Tensile impact strength (kg/cm$^2$) | 40 | N |
| Spiral flow (mm) | 520 | 420 |

Note: N means not broken

TABLE 2

| | Example No. | |
|---|---|---|
| | 9 | 10 |
| Component | | |
| A | C$_2$-C$_6$② | C$_2$-C$_6$② |
| B | HPLD④ | HPLD⑤ |
| Ratio of Comp. A:Comp. B | 80:20 | 80:20 |
| Composition | | |
| MFR (g/10 min.) | — | — |
| ME | — | — |
| Haze (%) | 24 | 21 |
| Properties | | |
| Rockwell hardness | — | — |
| Tensile strength at break (kgf/cm$^2$) | 480 | 452 |
| Izod impact strength at −30° C. (kgf · cm/cm$^2$) | N | N |
| Modulus in flexure (kgf/cm$^2$) | 494 | 449 |
| Brittleness temperature (°C.) | −60 | −55 |
| Tensile impact strength (kg/cm$^2$) | — | — |
| Spiral flow (mm) | 540 | 620 |

Note: N means no broken

What is claimed is:

1. A resin composition for injection molding, said resin composition containing 50 to 99% by weight of component A and 1 to 50% by weight of component B, said component A comprising a copolymer of ethylene and an alpha-olefin having a carbon number not less than 4, said component A having the following properties (a) to (c):

(a) a melt flow rate (MFR) of 10 to 120 g/10 min.;

(b) a density (D) of not more than 0.915 g/cm$^3$; and (c) at least one peak of elution volume indicated by an elution curve obtained by temperature rising elution fractionation (TREF), wherein said peak corresponds to a temperature of not more than 85° C. and said elution curve may also indicate substantial elution volume at temperatures other than the temperature to which said peak corresponds, wherein said component A is produced by polymerization using a metallocene catalyst, said component B comprising a high-pressure processed low-density polyethylene having the following properties: a melt flow rate of 10 to 100 g/10 min.; a density of 0.915 to 0.93 g/cm$^3$; and a memory effect (ME) of not less than 1.3.

2. A resin composition according to claim 1 wherein said component A is contained in an amount of 50 to 95% by weight, and said component B is contained in an amount of 50 to 5% by weight.

3. A resin composition according to claim 1 wherein said component A is contained in an amount of 60 to 90% by weight, and said component B is contained in an amount of 40 to 10% by weight.

4. A resin composition according to claim 1 wherein said component A has a melt flow rate of 10 to 70 g/10 min.

5. A resin composition according to claim 1 wherein said component A has a density of 0.86 to 0.912 g/cm$^3$.

6. A resin composition according to claim 1 wherein said component A has a density of 0.870 to 0.910 g/cm$^3$.

7. A resin composition according to claim 1 wherein said component A has a single peak of elution volume indicated by an elution curve obtained by temperature rising elution fractionation, which peak corresponds to a temperature of not more than 75° C.

8. A resin composition according to claim 1 wherein said component A has a single peak of elution volume indicated by an elution curve obtained by temperature rising elution fractionation, which peak corresponds to a temperature of not more than 60° C.

9. A resin composition according to claim 1 wherein said component A has an elution volume Y, in % of the weight thereof with respect to the total weight of the component A, at an elution temperature of 40° C. in temperature rising elution fractionation, said elution volume Y satisfying the following condition:

$$Y \leq -3600D + 3304$$

(where D represents the density of the component A) but $Y \leq 100$.

10. A resin composition according to claim 1 wherein said component A has an elution volume Y, in % of the weight thereof with respect to the total weight of the component A, at an elution temperature of 40° C. in temperature rising elution fractionation, said elution volume Y satisfying the following condition:

$$Y \leq -3800D + 3482$$

(where D represents the density of the component A) but $Y \leq 100$.

11. A resin composition according to claim 1 wherein said component A has a haze of not more than 70%, as measured in accordance with Japanese Industrial Standards K7105 with respect to an injection-molded sheet made of said component A and having a thickness of 2 mm.

12. A resin composition according to claim 1 wherein said component A has a haze of not more than 40%, as measured in accordance with Japanese Industrial Standards K7105 with respect to an injection-molded sheet made of said component A and having a thickness of 2 mm.

13. A resin composition according to claim 1 wherein said component A has a haze of not more than 30%, as measured in accordance with Japanese Industrial Standards K7105 with respect to an injection-molded sheet made of said component A and having a thickness of 2 mm.

14. A resin composition according to claim 1 wherein said component B comprises high-pressure processed low-density polyethylene having the following properties: a memory effect (ME) of not less than 1.3; and a Q value of not less than 5, wherein the Q value is the ratio of the number average molecular weight to the weight average molecular weight.

15. A resin composition according to claim 1, having the following properties: a haze of not more than 50%, as measured in accordance with Japanese Industrial Standards K7105 with respect to an injection molded sheet made of said resin composition and having a thickness of 2 mm; a melt flow rate of 5 to 100 g/10 min.; and a memory effect of not less than 1.1.

16. A resin composition according to claim 1, wherein said resin composition has a haze of not more than 70% (as measured in accordance with Japanese Industrial Standards K7105 with respect to an injection-molded sheet made of said resin copolymer and having a thickness of 2 mm).

17. A resin composition according to claim 1, wherein said resin composition has a haze of not more than 50% (as measured in accordance with Japanese Industrial Standards K7105 with respect to an injection-molded sheet made of said resin copolymer and having a thickness of 2 mm).

18. A resin composition according to claim 1, wherein said resin composition has a haze of not more than 40% (as measured in accordance with Japanese Industrial Standards K7105 with respect to an injection-molded sheet made of said resin copolymer and having a thickness of 2 mm).

19. A resin composition according to claim 1, wherein said resin composition has a haze of not more than 30% (as measured in accordance with Japanese Industrial Standards K7105 with respect to an injection-molded sheet made of said resin copolymer and having a thickness of 2 mm).

20. A resin composition according to claim 1, wherein said resin composition has a haze of not more than 25% (as measured in accordance with Japanese Industrial Standards K7105 with respect to an injection-molded sheet made of said resin copolymer and having a thickness of 2 mm).

21. A resin composition according to claim 1, wherein said resin composition has a melt flow rate within a range of from 5 to 100 g/10 min.

22. A resin composition according to claim 1, wherein said resin composition has a memory effect of not less than 1.1.

23. A resin composition according to claim 1, wherein said component A has a melt flow rate of 30 to 70 g/10 min.

24. A resin composition according to claim 1, wherein said component B has a melt flow rate of 10 to 50 g/10 min.

25. A resin composition according to claim 1, wherein said component B has a density of 0.918 to 0.927 g/cm$^3$.

26. A resin composition according to claim 1, wherein said component B has a density of 0.919 to 0.923 g/cm$^3$.

27. A resin composition according to claim 1, wherein said component B has a memory effect of not less than 1.6.

28. A resin composition according to claim 1, wherein said component B has a memory effect of not less than 1.8.

29. A resin composition according to claim 1, wherein said component B has a Q value of not less than 7, wherein the Q value is the ratio of the number average molecular weight to the weight average molecular weight.

30. A resin composition according to claim 1, wherein said component B has a Q value of not less than 9, wherein the Q value is the ratio of the number average molecular weight to the weight average molecular weight.

* * * * *